(12) United States Patent
Bates (10) Patent No.: US 8,641,793 B2
(45) Date of Patent: Feb. 4, 2014

(54) DEVICES, SYSTEMS, AND METHODS FOR SEPARATION OF FEEDSTOCK COMPONENTS

(75) Inventor: Lyle Bates, Puyallup, WA (US)

(73) Assignee: Paradigm Waterworks, LLC, Tacoma, WA (US)

( * ) Notice: Subject to any disclaimer, the term of this patent is extended or adjusted under 35 U.S.C. 154(b) by 437 days.

(21) Appl. No.: 12/962,409

(22) Filed: Dec. 7, 2010

(65) Prior Publication Data

US 2011/0132192 A1 Jun. 9, 2011

Related U.S. Application Data

(60) Provisional application No. 61/267,364, filed on Dec. 7, 2009.

(51) Int. Cl.
*B03C 3/10* (2006.01)

(52) U.S. Cl.
USPC .......... 55/407; 55/408; 55/409; 95/28; 95/77; 95/78; 96/1; 96/2; 96/63; 96/94

(58) Field of Classification Search
USPC .......... 96/1, 2, 63, 94; 95/28, 77, 78; 55/400, 55/406–409
See application file for complete search history.

(56) References Cited

U.S. PATENT DOCUMENTS

| 640,694 | A | * | 1/1900 | Otto | 422/186.07 |
|---|---|---|---|---|---|
| 3,532,467 | A | | 10/1970 | Smith et al. | |
| RE26,990 | E | | 11/1970 | Bongiorno | |
| 3,762,135 | A | | 10/1973 | Ikebe et al. | |
| 4,092,130 | A | | 5/1978 | Wikdahl | |
| 4,093,432 | A | * | 6/1978 | Ahlrich | 96/78 |
| 4,282,835 | A | | 8/1981 | Peterson et al. | |
| 4,386,055 | A | * | 5/1983 | McBride | 422/186.18 |
| 4,480,595 | A | | 11/1984 | Hobby et al. | |
| 4,722,303 | A | | 2/1988 | Leonhard | |
| 5,000,003 | A | | 3/1991 | Wicks | |
| 5,277,703 | A | * | 1/1994 | Sklenak et al. | 95/77 |
| 5,343,699 | A | | 9/1994 | McAlister | |
| 5,380,355 | A | * | 1/1995 | Brothers | 96/64 |
| 5,531,811 | A | | 7/1996 | Kloberdanz | |

(Continued)

FOREIGN PATENT DOCUMENTS

| JP | 52-36371 A | * | 3/1977 | 96/94 |
|---|---|---|---|---|
| JP | 56040424 A | | 4/1981 | |
| JP | 10192602 A | | 7/1998 | |
| WO | WO 2004/053305 A1 | | 6/2004 | |
| WO | WO 2011/060399 A2 | | 5/2011 | |
| WO | WO 2011/071873 A2 | | 10/2011 | |

OTHER PUBLICATIONS

Udengaard, Niels R., et al., Hydrogen Production by Steam Reforming of Hydrocarbons, Haldor Topsoe Inc., 2 pgs., Prepr. Pap.-Am. Chem. Soc., Div. Fuel Chem. 2004, 49(2), 906.

(Continued)

*Primary Examiner* — Richard L Chiesa
(74) *Attorney, Agent, or Firm* — Stoel Rives LLP (57) ABSTRACT

Separation systems can utilize a combination of forces to separate constituent components of a working fluid from each other. Some separation systems utilize one or more of centrifugal and gravitational forces in the purification of hydrogen gas. Some separation systems can utilize one or more of electromotive and magnetic forces in the purification of hydrogen gas.

37 Claims, 6 Drawing Sheets

(56) References Cited

U.S. PATENT DOCUMENTS

| | | | |
|---|---|---|---|
| 6,203,600 B1* | 3/2001 | Loreth | 96/40 |
| 6,209,494 B1 | 4/2001 | Manikowski, Jr. et al. | |
| 6,228,148 B1 | 5/2001 | Aaltonen et al. | |
| 6,508,209 B1 | 1/2003 | Collier, Jr. | |
| 6,702,877 B1 | 3/2004 | Swanborn | |
| 6,968,700 B2 | 11/2005 | Lott et al. | |
| 7,153,489 B2 | 12/2006 | Bingham et al. | |
| 7,210,467 B2 | 5/2007 | Kweon et al. | |
| 7,293,533 B2 | 11/2007 | Hemsath | |
| 7,569,094 B2 | 8/2009 | Kane et al. | |
| 8,029,601 B2 | 10/2011 | Franzen et al. | |
| 2002/0046561 A1 | 4/2002 | Bronicki et al. | |
| 2005/0176831 A1 | 8/2005 | Inui et al. | |
| 2005/0183421 A1 | 8/2005 | Vaynberg et al. | |
| 2006/0182680 A1 | 8/2006 | Keefer et al. | |
| 2007/0137191 A1 | 6/2007 | Kweon et al. | |
| 2008/0009402 A1* | 1/2008 | Kane et al. | 494/53 |
| 2008/0010993 A1 | 1/2008 | Morgenstern | |
| 2008/0081844 A1 | 4/2008 | Shires et al. | |
| 2008/0105127 A1* | 5/2008 | Brothier et al. | 96/19 |
| 2008/0264251 A1* | 10/2008 | Szepessy | 95/35 |
| 2009/0056542 A1 | 3/2009 | Carew | |
| 2009/0056550 A1* | 3/2009 | Chung | 96/68 |
| 2009/0176638 A1 | 7/2009 | Bella | |
| 2009/0200176 A1 | 8/2009 | McCutchen et al. | |
| 2009/0230359 A1 | 9/2009 | Guvelioglu et al. | |
| 2009/0266231 A1 | 10/2009 | Franzen et al. | |
| 2011/0114037 A1 | 5/2011 | Bates | |

OTHER PUBLICATIONS

Youn, Moon-Jung, "Hydrogen Production from Methane Under an Oxygen-Enriched Conditions Using Compression Ignition Engine," J. Ind. Eng. Chem., vol. 13, No. 7, 2007, pp. 1117-1121.

Leung, Perry, "Raising the Fuel Heating Value and Recovering Exhaust Heat by On-board Oxidative Reforming of Bioethanol," Energy Environ. Sci., 2010, 3, pp. 780-788, first published on May 10, 2010.

Jamal, Y., et al., "Onboard Generation of Hydrogen-Rich Gaseous Fuels—a Review," International Journal of Hydrogen Energy, vol. 19, No. 7, pp. 557-572, 1994, Received for publication Sep. 1, 1993, 6 pgs.

Notification Concerning Transmittal of International Preliminary Report on Patentability dated May 31, 2012, issued in International Application No. PCT/US2010/056783, which claims priority to U.S. Appl. No. 61/261,720.

International Search Report dated Jul. 31, 2012, issued in International Application No. PCT/US2010/056783, which claims priority to U.S. Appl. No. 61/261,720.

Notification Concerning Transmittal of International Preliminary Report on Patentability dated Jun. 21, 2012, issued in International Application No. PCT/US2010/059224, which claims priority to U.S. Appl. No. 61/267,364.

International Search Report dated Aug. 31, 2011, issued in International Application No. PCT/US2010/059224, which claims priority to U.S. Appl. No. 61/267,364.

* cited by examiner

DEVICES, SYSTEMS, AND METHODS FOR SEPARATION OF FEEDSTOCK COMPONENTS

CROSS-REFERENCE TO RELATED APPLICATIONS

This application claims the benefit of U.S. Provisional Patent Application No. 61/267,364, titled DEVICES, SYSTEMS, AND METHODS FOR SEPARATION OF FEEDSTOCK COMPONENTS, which was filed on Dec. 7, 2009, the entire contents of which are hereby incorporated by reference herein.

TECHNICAL FIELD

The present disclosure relates generally to the separation of components, such as the components of a fuel feedstock. Certain embodiments relate more specifically to the separation and isolation of hydrogen gas.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments.

Certain embodiments of separation units disclosed herein are configured to separate one or more constituent components (e.g., molecules, particles, etc.) from a feedstock, such as a fuel feedstock. One or more of the separated components can be isolated into a pure or relatively pure form. For example, in some embodiments, a hydrocarbon feedstock (e.g., coal) is gasified and the resultant constituent components of the feedstock are separated from each other via a separation unit that uses a combination of independent separation forces, including centrifugal, gravitational, electrical, magnetic, and/or fluid pressure forces. Embodiments of the separation unit can have a relatively simple and low-maintenance construction and can be highly efficient. In some embodiments, separation systems that employ one or more separation units can isolate hydrogen gas in a substantially pure form (e.g., may yield about 99.999 percent pure hydrogen or greater than about 99.999 percent pure hydrogen), and may do so in an economical and environmentally beneficial manner. While some embodiments may be used commercially on a large scale, other embodiments can be operated on a relatively small scale, such as at a residential building or onboard an automotive vehicle. The systems thus can provide hydrogen fuel locally, which can reduce or eliminate challenges that may be associated with the distribution of hydrogen fuel. These and/or other advantages of embodiments of separation systems will be apparent from the disclosure that follows.

Figure 1:
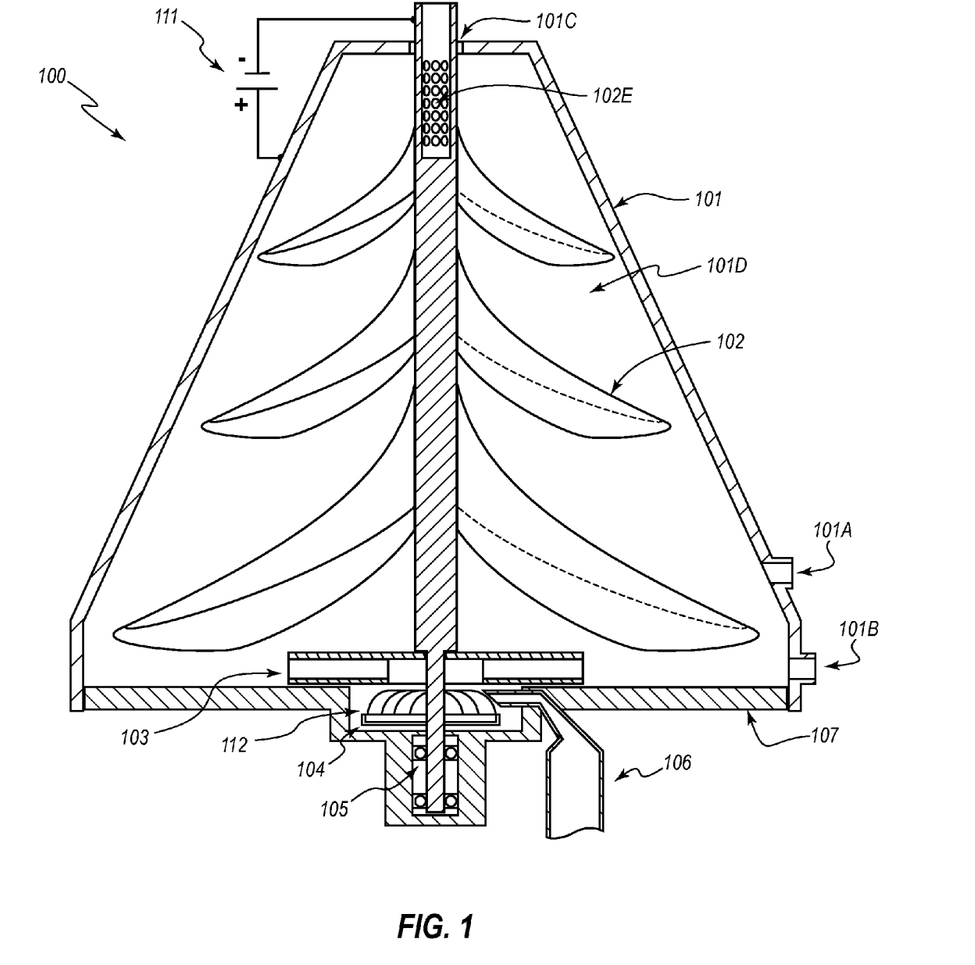
FIG. 1 is a cross-sectional view of an embodiment of a separation unit.
Figure 2:
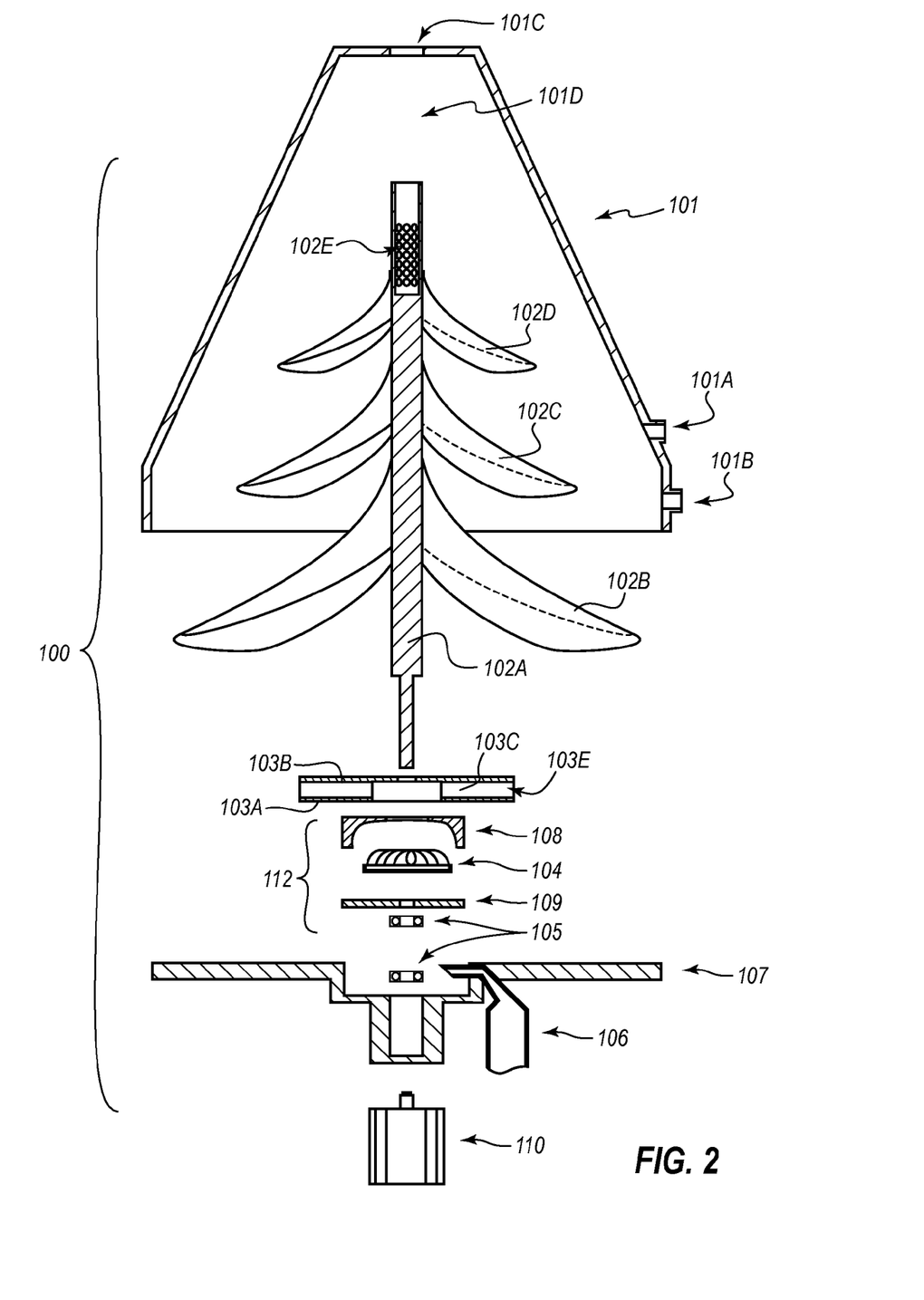
FIG. 2 is an exploded cross-sectional elevation view of the separation unit of FIG. 1.

FIGS. 1 and 2 illustrate an embodiment of a separation system or separation unit 100. The separation unit 100 can include a shell or housing 101 that defines a mechanical barrier for the containment of a working fluid. The housing 101 can comprise any suitable material, and preferably is capable of retaining an electrical charge, conducting an electrical current, and/or providing a magnetic field. In various embodiments, the housing 101 can comprise one or more metallic materials.

The housing 101 can define at least a portion of the outer contours of a pressure chamber or separation chamber 101D. The housing 101 can include one or more evacuation ports 101A, 101B, which can be vertically or longitudinally spaced from each other. One or more additional evacuation ports 101C can be vertically or longitudinally spaced from the evacuation ports 101A, 101B. In the illustrated embodiment, the one or more evacuation ports 101C are at an upper end of the separation chamber 101D. Each of the evacuation ports 101A, 101B, 101C can provide an egress path from the separation chamber 101D, and thus may also be referred to as exit ports from the separation chamber 101D.

In the illustrated embodiment, the separation chamber 101D has a substantially triangular or trapezoidal cross-section, with the wider region thereof at the base of the separation chamber 101D. In some embodiments, the separation chamber 101D is circularly symmetrical such that any cross-section through a longitudinal axis thereof is substantially the same. For example, the separation chamber 101D can be substantially conical or substantially frustoconical. Other suitable arrangements of the separation chamber 101D are also possible.

Figure 3:
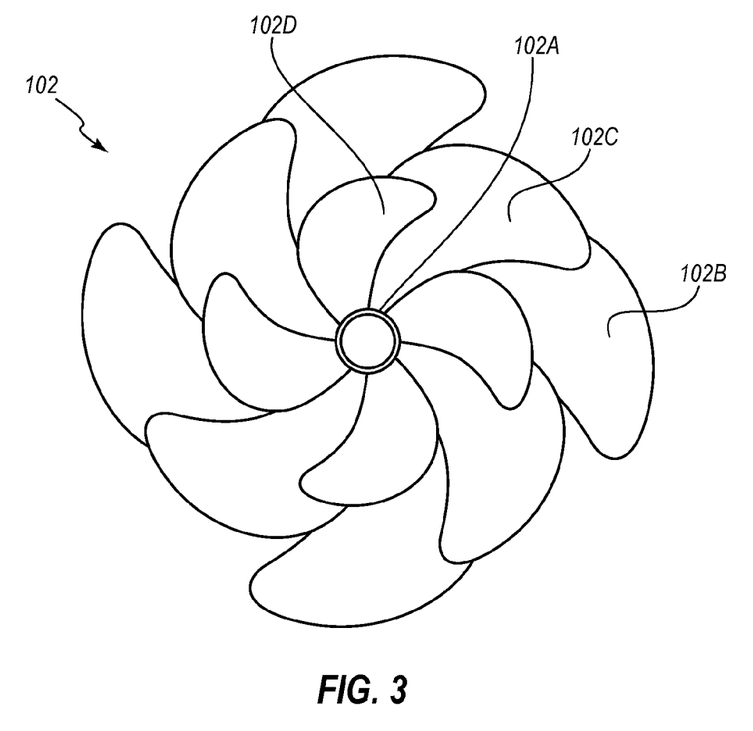
FIG. 3 is a top plan view of an embodiment of an impeller stack, which is shown in elevation in FIG. 2.

The separation chamber 101D can be sized and shaped to receive an impeller stack 102 therein. The impeller stack 102 can include a central shaft 102A from which a plurality of impellers, blades, or appendages 102B, 102C, 102D extend outwardly. In the illustrated embodiment, the impeller stack 102 includes multiple levels or layers of differently sized appendages, with large appendages 102B being nearest the base thereof, mid-sized appendages 102C being in a medial region thereof, and small appendages 102D being nearest the top thereof. In the illustrated embodiment, each layer includes four appendages 102B, 102C, 102D, respectively. The appendages can be substantially crescent-shaped (see FIG. 3) such that open space exists between neighboring appendages of a given layer. Other suitable configurations of the appendages are also possible. As shown in FIGS. 1 and 2, the appendages can be bow-shaped in cross-section so as to extend in a substantially transverse direction at a base end thereof and so as to arc upwardly toward the shaft 102A. Other suitable arrangements of the impeller stack 102 are also possible.

The central shaft 102A of the impeller stack 102 can include one or more openings 102E through which a particular type of separated components can egress from the chamber 101D. In some embodiments, hydrogen is permitted to exit through the openings 102E.

The impeller stack 102 can comprise any suitable material, and preferably is capable of retaining an electrical charge, conducting an electrical current, and/or providing a magnetic field. In various embodiments, the impeller stack 102 comprises a metal. Specifically, as further discussed below, in some embodiments, the shaft 102A and/or one or more of the appendages 102B, 102C, 102D can be electrically charged and/or can conduct an electrical current during operation of the separation unit 100.

As further discussed below, in some embodiments, each of the housing 101 and the impeller stack 102 is provided with an electric charge such that an electric field is present within the separation chamber 101D. In particular, the housing 101 and the impeller stack 102 can be maintained at opposite polarities. In the embodiment illustrated in FIG. 1, opposite terminals of a charge source or direct current source 111 are electrically connected to the housing 101 and the impeller stack 102. Specifically, the positive terminal is connected to the housing 101 and the negative terminal is connected to the impeller stack 102. In other embodiments, a first charge source may be connected to the housing 101 and a second or separate charge source may be connected to the impeller stack 102. In some embodiments, each of the appendages 102B, 102C, 102D are at the same polarity and may be at substantially the same voltage. Moreover, those portions of each appendage that bear a charge may each be at substantially the same voltage.

Figure 4:
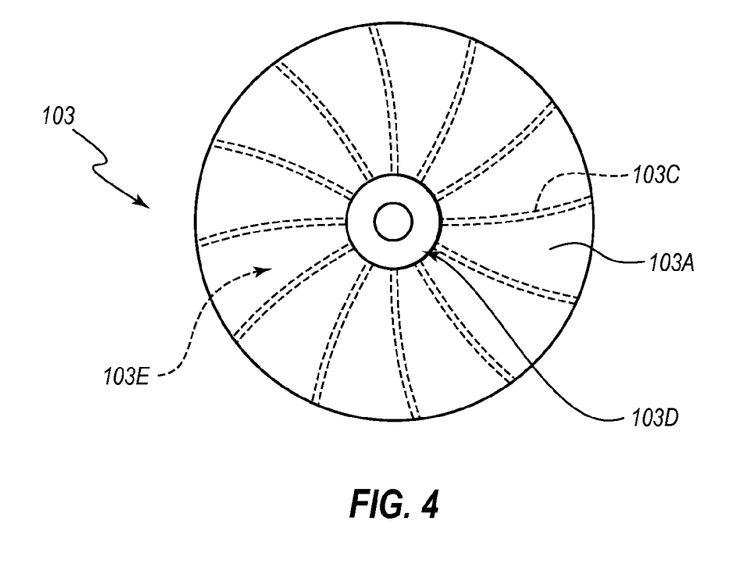
FIG. 4 is a bottom plan view of an embodiment of a diffusing impeller, which is shown in elevation in FIG. 2.

With reference to FIGS. 1, 2, and 4, the separation unit 100 can further include a diffusing impeller 103. In the illustrated embodiment, the diffusing impeller 103 is shaped substantially as a planar disk having a lower plate 103A and an upper plate 1038 that are spaced from each other. A series of blades 103C can be positioned between the lower and upper plates 103A, 103B and extend radially so as to define a series of channels 103E. The blades 103C are shown in broken lines in FIG. 4, as they would be hidden by the lower plate 103A in the illustrated view. Entrance to the channels 103E can be provided by an opening 103D in the lower plate 103A (see FIG. 4). As further discussed below, when the system 100 is in operation, the diffusing impeller 103 can rotate rapidly and receive therein a working fluid via the opening 103D. The working fluid can pass through the channels 103E and be directed radially outwardly at a base end of the separation chamber 101D. The channels 103E thus can also be referred to as entrance ports into the separation chamber 101D. In some embodiments, the diffusing impeller 103 can be coupled with the impeller stack 102 such that these components of the separation unit 100 rotate in unison (e.g., at the same angular velocity). Other arrangements are also possible.

With reference to FIGS. 1 and 2, the separation unit 100 can include any suitable turbine assembly 112. For example, in some embodiments, supercharger or turbocharger arrangements may be used. In the illustrated embodiment, the turbine assembly 112 includes a turbine wheel 114 that is housed between an upper pressure chamber component 108 and a pressure chamber base plate 109. The upper pressure chamber component 108 and the pressure chamber base plate 109 cooperate to form a pressure chamber. The pressure chamber can include an opening or other suitable pathway that is in fluid communication with the opening 103D in the lower plate 103A of the diffusing impeller 103 such that a forced fluid stream can exit the turbine assembly 112 into the diffusing impeller 103. The turbine assembly 112 can be configured to convert at least a portion of energy imparted by high-energy steam into rotational motion in any suitable manner. In some embodiments, the turbine wheel 104 is connected to the diffusing impeller 103 and the impeller stack 102 such that rotation of the turbine wheel 104 effects movement of the diffusing impeller 103 and the impeller stack 102.

In some embodiments, the separation unit 100 includes a rotational assist motor 110, which can impart rotational energy to the turbine wheel 104 (and the diffusing impeller 103 and the impeller stack 102) supplemental to that imparted by the high-energy steam. For example, in some embodiments, the rotational assist motor 110 can be selectively engaged so as to operate when it is determined that loads on a fluid stream entering the turbine wheel 104 are too great such that the pressure or temperature of the fluid stream as it enters the diffusing impeller 103 is lower than desired.

The rotational assist motor 110, the turbine assembly 112, and the housing 101 can be mounted to a base 107. The base 107 can be formed of any suitable material. In some embodiments, the base 107 may be electrically coupled with the housing 101, whereas in other embodiments, the base 107 may be electrically shielded from the housing 101. The turbine wheel 104, the diffusing impeller 103, and the impeller stack 102 can be supported by one or more bearing devices 105, which can provide a desired alignment of these rotational elements 104, 103, 102 and can reduce or eliminate radial and/or axial displacement of these elements. The bearing devices 105 can reduce frictional energy losses during operation of the separation unit 100.

The separation unit 100 can include, or can be in fluid communication with, a gasification unit 106. The gasification unit 106 can include any suitable gasifier or gasification system. The gasification unit 106 can utilize thermo-chemical processes (which may include oxidation or partial oxidation) to break down coal or any other suitable carbon-based feedstock into its basic chemical constituents. For example, the gasification unit 106 can receive steam therein, along with controlled amounts of air or oxygen, under high temperatures and pressures such that molecules in the feedstock can break apart, which can result in a fluid stream that includes (e.g., is laden with) the constituent components of the feedstock. The term "fluid" is used herein in its ordinary sense, and can include one or more liquids, gases, or combinations thereof. In certain embodiments, the fluid stream includes high temperature steam, hydrogen ($H_2$), oxygen ($O_2$), carbon monoxide (CO), carbon dioxide ($CO_2$), particulates (e.g., carbon particulates), etc. In the illustrated embodiment, the gasification unit 106 includes a conduit that directs a fluid stream into the turbine assembly 112.

Together, the turbine assembly 112, the base 107, the bearing devices 105, the rotational assist motor 110, and the gasification unit 106 can be referred to as a base assembly 113. As discussed above, and as addressed further hereafter, the base assembly 113 can be configured to provide a working fluid to the separation chamber 101D and/or to rotate the impeller stack 102 and the diffuser impeller 103.

Figure 5:
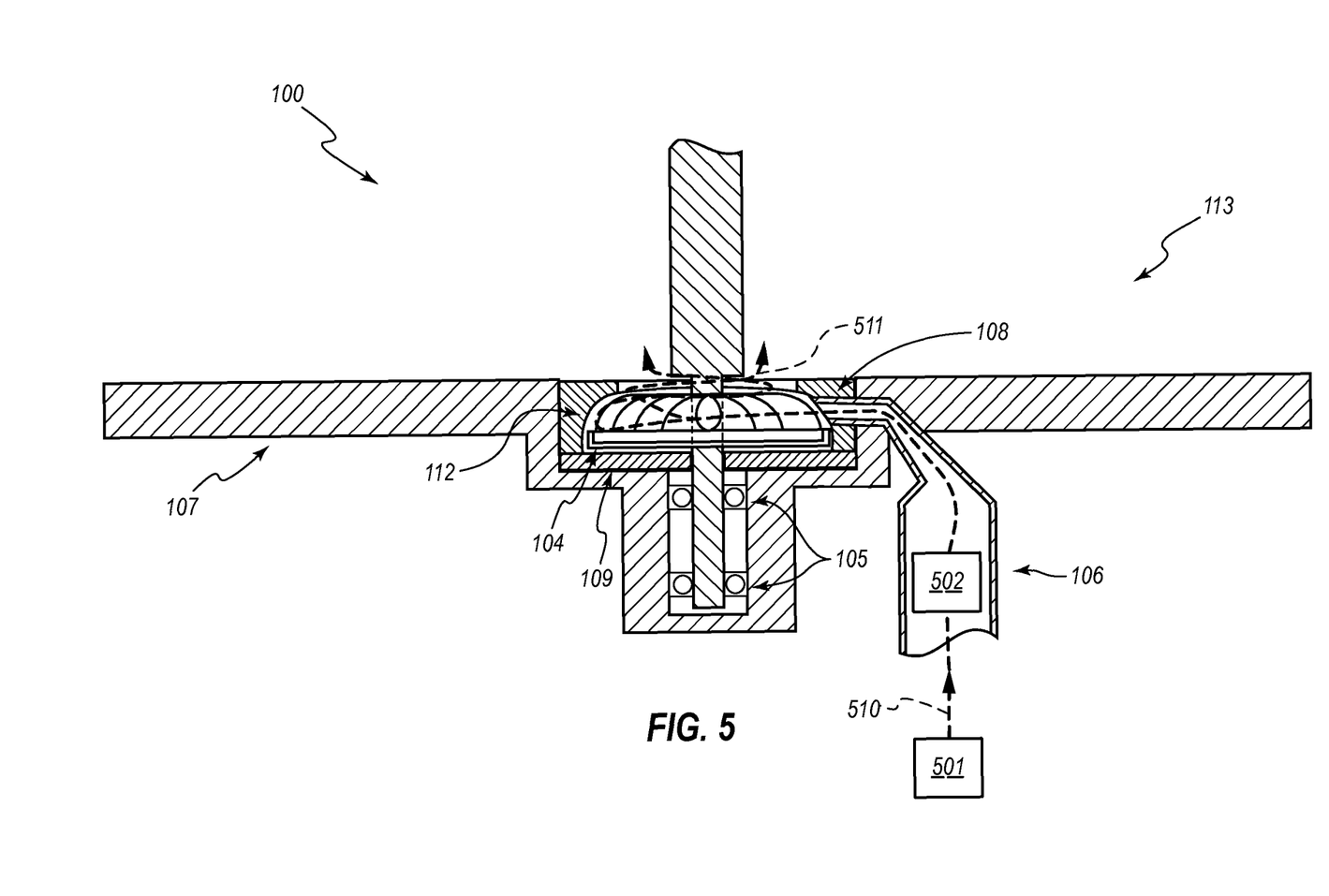
FIG. 5 is a cross-sectional view of a base assembly portion of the separation unit of FIG. 1.

FIG. 5 shows an embodiment of the base assembly 113 in an assembled and operational state, while the remaining portions of the separation unit 110 are not shown for purposes of clarity. As illustrated, steam 510 from a steam source 501 is introduced into the gasification unit 106. The steam source 501 can be of any suitable variety. As further discussed below, in some embodiments, the steam source 501 can comprise a mechanical vapor recompressor and/or can be configured to heat steam via interaction with exhaust gases from an internal combustion engine. The steam 510 can be provided to the gasification unit 106 at a high temperature, high pressure, and/or high velocity.

Feedstock 502 also can be provided to the gasification unit 106. The feedstock 502 can be of any suitable variety, and can include, for example, any of various forms of coal or other hydrocarbon materials. The gasification unit 106 can operate on the feedstock 502 via the input stream of steam 510 in any suitable manner to provide an output stream of working fluid 511, which includes liberated components of the feedstock 502. As previously mentioned, in certain embodiments, the output stream of working fluid 511 includes high temperature steam, hydrogen ($H_2$), oxygen ($O_2$), carbon monoxide (CO), carbon dioxide ($CO_2$), and particulates. The working fluid 511 can impart rotational energy to the turbine wheel 104 of the turbine assembly 112 and can exit the turbine assembly 112 into diffusing impeller 103.

Figure 6:
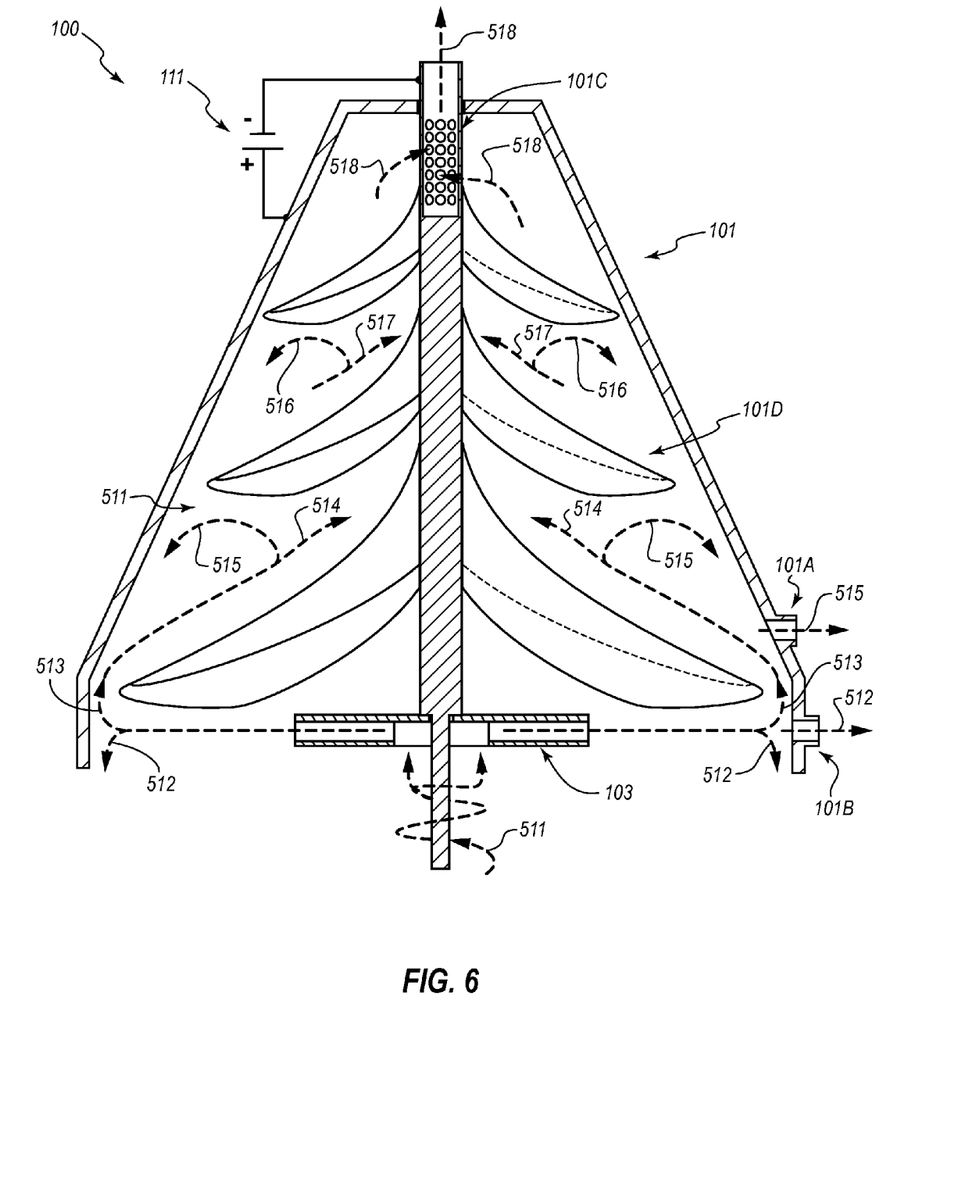
FIG. 6 is a cross-sectional view of an upper portion of the separation unit of FIG. 1.

FIG. 6 shows an embodiment of an upper portion of the separation unit 110 in an assembled and operational state, while the base assembly 113 is not shown for purposes of clarity. The working fluid 511 is shown being received into the diffuser impeller 103, which rotates at a rapid rate. Due to the rapid rotation of the diffuser impeller 103 and the forceful entrance of the working fluid 511 therein, the working fluid 511 is directed radially outwardly so as to rapidly exit the diffuser impeller 103 substantially horizontally (e.g., in a direction substantially perpendicular to a gravitational force acting thereon, in the illustrated embodiment). When within the separation chamber 101D, the working fluid 511 may be acted upon by a variety of forces, which can effect separation of the components thereof. Illustrative flow paths that the working fluid 511 may follow within the separation chamber 101D are depicted by arrows.

The arrows 512 and 513 illustrate initial flow paths that may be followed by the working fluid 511 upon entering the separation chamber 101D. The working fluid 511 is initially directed to a lower end of the sidewall of the housing 101. In the illustrated embodiment, the lower end of the sidewall is substantially perpendicular to a direction of travel of the initial flow path, although other arrangements are possible. The working fluid 511 can strike the sidewall of the housing 101, whereupon heavier matter, such as particulates, may lose energy and fall out of suspension due to gravitational force, as depicted at arrows 512. In contrast, lighter matter may be drawn upward within the separation chamber 101, as depicted at arrows 513. Contours of the flow paths can be affected by, for example, the pressure at which working fluid 511 enters the separation chamber 101D, the pressure within the separation chamber 101D, and/or other forces acting on the working fluid 511, as discussed further below.

As previously mentioned, the impeller stack 102 can rotate rapidly within the separation chamber 101D and, in some embodiments, can be connected with the diffusing impeller 103 such that both components rotate at the same rate. This rotation can cause the working fluid 511 to likewise rotate within the separation chamber 101D. Rapid rotation of the working fluid 511 can result in centrifugal forces that cause heavier components to circulate at larger radii (e.g., closer to the housing 101) and cause lighter components to circulate at smaller radii (e.g., closer to the shaft 102A of the impeller stack 102). Illustrative flow paths of heavier components are depicted by the arrows 515, 516, whereas illustrative flow paths of lighter components are depicted by the arrows 514, 517.

The separation unit 100 can be oriented such that gravitational forces cause heavier (more massive) components to circulate in lower paths and cause lighter (less massive) components to circulate in higher paths. This is also reflected in the illustrative flow paths depicted by the arrows 514, 517 (light components) and 515, 516 (heavy components). The lightest components can rise to the top of the separation chamber 101D and can migrate toward the center thereof, as indicated by the arrows 518.

In certain embodiments, electrical polarization of the housing 101 and/or the impeller stack 102 can aid in separation of the components of the working fluid 511. The separation forces provided by electrical polarization of the housing 101 and/or the impeller stack 102 can, in some instances, assist in loosening independent components (e.g., lighter and heavier components) from each other that might be stuck together or otherwise coupled with each other. In further instances, these separation forces can assist in loosening or separating independent components that may be bound to each other via a molecular atomic bond. This can aid in a more thorough separation of the constituent components, since, if the components remained coupled, they would have a larger mass than fully separated components and thus would be undesirably urged outward and downward under the influence of centrifugal and gravitational forces, respectively, to a greater extent than would the fully separated components. In some embodiments, providing even a relatively small polarization to the impeller stack 102 and/or the housing 101 can greatly assist in the separation of constituent elements within the separation chamber 101D.

In the illustrated embodiment, the direct current source 111 provides a positive charge to the housing 101 and a negative charge to the impeller stack 102 (including both the shaft 102A and the appendages 102B, 102C, 102D). Accordingly, the separation chamber 101D is configured such that positively charged components are repelled by the housing 101 and are attracted to the impeller stack 102, and negatively charged components are attracted to the housing 101 and are repelled by the impeller stack 102. This can encourage constituent components to separate from each other. For example, in some embodiments, water ($H_2O$) molecules can be separated into their constituent parts, with elemental oxygen atoms migrating toward the housing 101 and elemental hydrogen atoms migrating toward the impeller 102 under the influence of electrical fields provided within the separation chamber 101D.

Additionally, at a fixed position in space within the separation chamber 101D, the electric field will fluctuate rapidly due to the alternating passage of charged appendages 102B, 102C, 102D and spaces between adjacent appendages 102B, 102C, 102D. This variation in the electric field acting on constituent components at or near the fixed position in space can further aid in separating the components. For example, it can be similar in effect to shaking the components, or compounds of which they are a port, or otherwise disrupting, stressing, straining, or decoupling bonds between constituent components.

Moreover, because the charged impeller stack 102 is rotating rapidly, it creates magnetic fields within the chamber 101D. The magnetic fields can affect different types of constituent components in different ways, and/or can affect different types of constituent components in the same way but to differing degrees, which can further assist in separation of the different types of components. For example, in some cases, hydrogen elements or molecules interact with magnetic fields differently than do oxygen elements or molecules (for example, diatomic hydrogen is diamagnetic, whereas diatomic oxygen is paramagnetic).

Additionally, at a fixed position in space within the separation chamber 101D, the magnetic field will fluctuate rapidly due to the alternating passage of charged appendages 102B, 102C, 102D and spaces between adjacent appendages 102B, 102C, 102D. This variation in the magnetic field acting on constituent components at or near the fixed position in space can further aid in separating the components. For example, it can be similar in effect to shaking the components, or compounds of which they are a port, or otherwise disrupting, stressing, straining, or decoupling bonds between constituent components.

In certain embodiments, the polarized housing 101 and impeller stack 102 and/or a magnetized impeller stack 102 can effect electrolysis (e.g., high-temperature electrolysis). For example, the working fluid can include a conducting fluid (e.g., steam), and the polarization and/or fluctuating magnetic field can give rise to an electromotive force that disrupts constituent components within the working fluid so as to assist in separating different types of components from each other.

The separation unit 100 can achieve an operational equilibrium such that specific components are positioned in specific regions of the separation chamber 101D. For example, in the illustrated embodiment, when the separation unit 100 achieves equilibrium, hydrogen gas is isolated at an upper end of the separation chamber 101D. As shown at arrow 518, hydrogen gas can be removed from the separation chamber 101D via the evacuation ports 101C at a center of the separation unit 100. In contrast, heavier off gases can circulate the separation chamber 101D in a collection band, or region, that is lower than the hydrogen gas and at an outer extremity thereof. The oxygen gas can be removed from the separation chamber 101D via the evacuation port 101A. Even heavier particulates can be removed from the separation chamber 101D via the evacuation port 101B. If desired, components removed via any of the evacuation ports 101A, 101B, 101C can be provided to additional separation units 100 for further purification. In some embodiments, one or more separation units 100 can yield hydrogen gas that is about or at least 99.999 percent pure.

In some embodiments, the shape of the separation chamber 101D can assist in achieving the desired equilibrium. For example, in the illustrated embodiment, the trapezoidal cross-section of the separation chamber 101D can assist in maintaining various heavier components in a relatively narrow vertical collection bands within a lower region of the separation chamber 101D, whereas a group of lighter components that is desirably removed via the port 101C can be spread over a relatively wider vertical collection band at the top of the separation chamber 101D. This can facilitate the removal of desired components from specific regions of the separation chamber 101D. In various embodiments, the vertical position of one of more of the evacuation ports 101A, 101B, 101C can be selected to target a specific grouping of a constituent component. In further embodiments, the position of one or more of the evacuation ports can be adjustable (e.g., movable in a longitudinal direction). In some embodiments, when the separation unit 100 is operating at equilibrium, hydrogen gas can be located in a band having a span that is within a range of from about the top fifth to about the top third of the separation chamber 101D.

In the illustrated embodiment, the shape of the housing 101 also can assist in the separation of lighter components from heavier components. In particular, the angled sidewalls can impart a downwardly directed force to heavier particles that move outwardly and into contact therewith (i.e., a component of the normal force imparted by the sidewall can be directed downward). A cross-section of the sidewall can be linear, as shown, or can define any other suitable shape and contour. An angle of the sidewall relative to a longitudinal axis of the housing 101 and/or a contour of the sidewall can be adjusted or optimized to achieve a desired separation effect.

In some embodiments, a pressure within the housing 101 also can affect the equilibrium operation of the separation unit 100. In many embodiments, an artificial or induced atmosphere is present within the housing 101 at a pressure that is elevated with respect to atmospheric pressure outside of the housing 101. Stated otherwise, the working fluid 511 that is being separated within the housing 101 may be at a greater pressure than air outside of the housing 100. In various embodiments, the pressure conditions can be adjusted to achieve differently sized or configured bands of separate constituent components, which can then be readily removed via different ports as discussed above.

With reference again to FIG. 2, the separation unit 100 can include any suitable control system 550 (e.g., one or more programmable logic controllers). The control system 550 can monitor outputs from any of the evacuation ports 101A, 101B, 101C, monitor conditions within the separation chamber 101D (e.g., temperature, pressure, and/or impeller stack 102 speed), and/or monitor inputs to the separation chamber 101D (e.g., steam and/or hydrocarbon input conditions to the gasification unit 106) in any suitable manner. The control system may also set, maintain, and/or dynamically alter any of the monitored parameters.

By way of example, in some embodiments, the rotation rate of the impeller stack is within a range of from about 5,000 rpm to about 25,000 rpm, or is no less than about 5,000 rpm, no less than about 10,000 rpm, no less than about 15,000 rpm, or no less than about 20,000 rpm; the pressure within the separation chamber 101D is within a range of from about 40 psi to about 100 psi, or is no less than about 40 psi, no less than about 50 psi, no less than about 75 psi, or no less than about 100 psi; and/or the direct current source 111 can provide a very low draw of current and can have a potential of from about 1.2 volts to about 2.9 volts, or of no less than about 1.0 volts, no less than about 1.2 volts, no less than about 1.5 volts, no less than about 2.0 volts, or no less than about 2.5 volts. Other values of one or more of the foregoing operational parameters can also be used in any suitable manner. In some embodiments, thermal energy may be used to control or otherwise achieve a desired pressure within the separation chamber 101D.

Various embodiments of the separation unit 100 may differ from the embodiments described above in some respects. For example, in some embodiments, only a portion of, substantially all of, or all of the housing 101 may be maintained at a first polarity, and a portion of, substantially all of, or all of the impeller stack 102 may be maintained at the opposite polarity. In other embodiments, the housing 101 does not bear a charge, whereas a portion of, substantially all of, or all of the impeller stack 102 does bear a charge. In further embodiments, only the shaft 102A of the impeller stack 102 is charged. In some embodiments, an alternating current source may be used in place of the direct current source 111 such that the polarities of the housing 101 and or the impeller stack 102 may alternate during operation of the separation unit 100. In some embodiments, the impeller stack 102 may be positively charged and/or the housing 101 may be negatively charged; such an arrangement can be suitable for purifying oxygen gas from a mixture of components that is void of hydrogen (e.g., in a separation unit 100 that receives its input from the off-gas evacuation port 101A). In still further embodiments, neither the housing 101 nor the impeller stack 102 is polarized (e.g., the direct current source 111 can be omitted). In other or further embodiments, the impeller stack 102 may be magnetized, such as via one or more electromagnets or permanent magnets. The one or more permanent magnets may be strategically placed on the impeller stack 102 to as to create a rotational magnetic flux, which can result in polarized separation of the constituent components. Any suitable combination of the foregoing embodiments is also contemplated.

In view of the foregoing, certain embodiments of the impeller stack 102 can be said to be configured to provide a magnetic field when rotating. In some embodiments, the impeller stack 102 bears a substantially constant electrical charge such that the magnetic field arises upon rotation of the impeller stack 102. In other embodiments, a charge on the impeller stack 102 may vary with time, such that a weak variable magnetic field may arise from the electrical current passing over or through the impeller stack 102, and the strength of the magnetic field can be augmented by rotation of the impeller stack 102. In other or further embodiments, the impeller stack 102 can comprise an electromagnet, which, in some embodiments, can provide a substantially constant magnetic field when the impeller stack 102 is stationary, and rotation of the impeller stack 102 can result in fluctuations of the magnetic field at a reference point within the separation chamber 101D, as described above. In still other or further embodiments, the impeller stack 102 can comprise a permanent magnet, which can provide a substantially constant magnetic field when the impeller stack 102 is stationary, and rotation of the impeller stack 102 can result in fluctuations of the magnetic field. However, in some embodiments, the impeller stack 102 is not configured to provide a magnetic field. For example, the impeller stack 102 may be neither charged nor magnetized.

Any suitable arrangement of the housing 101 is possible. For example, rather than a frustoconical shape, the housing 101 may be cylindrical. In some embodiments, more or fewer evacuation ports 101A, 101B, 101C may be used at different vertical positions. For example, in some embodiments, rather than evacuating off-gases via that evacuation port 101A, an additional port may be used from which a specific gas (e.g., oxygen) is removed from the separation chamber 101D. In some embodiments, the evacuation port 101C may be positioned only at a top surface of the housing 101 such that components are removed from the separation chamber 101D without passing through any portion of the impeller stack 102.

Any suitable arrangement of the impeller stack 102 is possible. For example, the impeller blades may be shaped differently than shown in the drawings. In some embodiments, the blades may be shaped substantially as straight rods or as cones.

In some embodiments, the impeller stack 102 can comprise carbon. For example, the appendages 102B, 102C, 102D of the impeller stack 102 can be formed of a pressed carbon material, which can be broken down via thermo-chemical processes such as discussed above with respect to the gasification unit 106. Indeed, in some embodiments, the carbon appendages 102B, 102C, 102D can be used in place of, or in addition to, the gasification unit 106. In such embodiments, the appendages 102B, 102C, 102D deteriorate over time and thus may be replaced once sufficiently spent.

In some embodiments, the working fluid may be supplied to the separation unit 100 from some source other than a gasification unit. For example, in some embodiments, the output of an evacuation port 101A, 101B, 101C of one separation unit 100 can be supplied as an input fluid stream to another separation unit 100. In other or further embodiments, the separation unit 100 may be devoid of a turbine assembly 112, and may, for example, merely include a motor for rotating the impeller stack 102 and diffusing impeller 103.

Directional terms, such as upper and lower, are used herein for convenience in referring to the drawings. Although some embodiments may in fact operate in a vertical or substantially vertical orientation such as that depicted in FIGS. 1-4, other embodiments may operate in other orientations. For example, in some embodiments, the shaft 102A of the impeller stack 102 may be horizontal, or may be at some other angle that is off-vertical, such as in embodiments where the operational parameters are such that the separation force provided by gravity is less important or even negligible as compared with other separation forces employed with the separation unit 100. Accordingly, such directional terms are not necessarily limiting for all embodiments of separation units.

One or more separation units 100 can be used within energy recovery systems such as those disclosed in U.S. patent application Ser. No. 12/947,040, titled SYSTEMS FOR ENERGY RECOVERY AND RELATED METHODS, filed Nov. 16, 2010, the entire contents of which are hereby incorporated by reference herein. For example, any of the hydrogen processors 150 described or illustrated in application Ser. No. 12/947,040 can comprise one or more suitable separation units 100. Accordingly, by way of further example, with reference to FIGS. 1, 7-10, and 13-15 of application Ser. No. 12/947,040, any of the pathways 139 can serve as the steam source 501 (see FIG. 5 of the present application), such that heated steam from a pathway 139 is delivered to the gasification unit 106.

Figure 7:
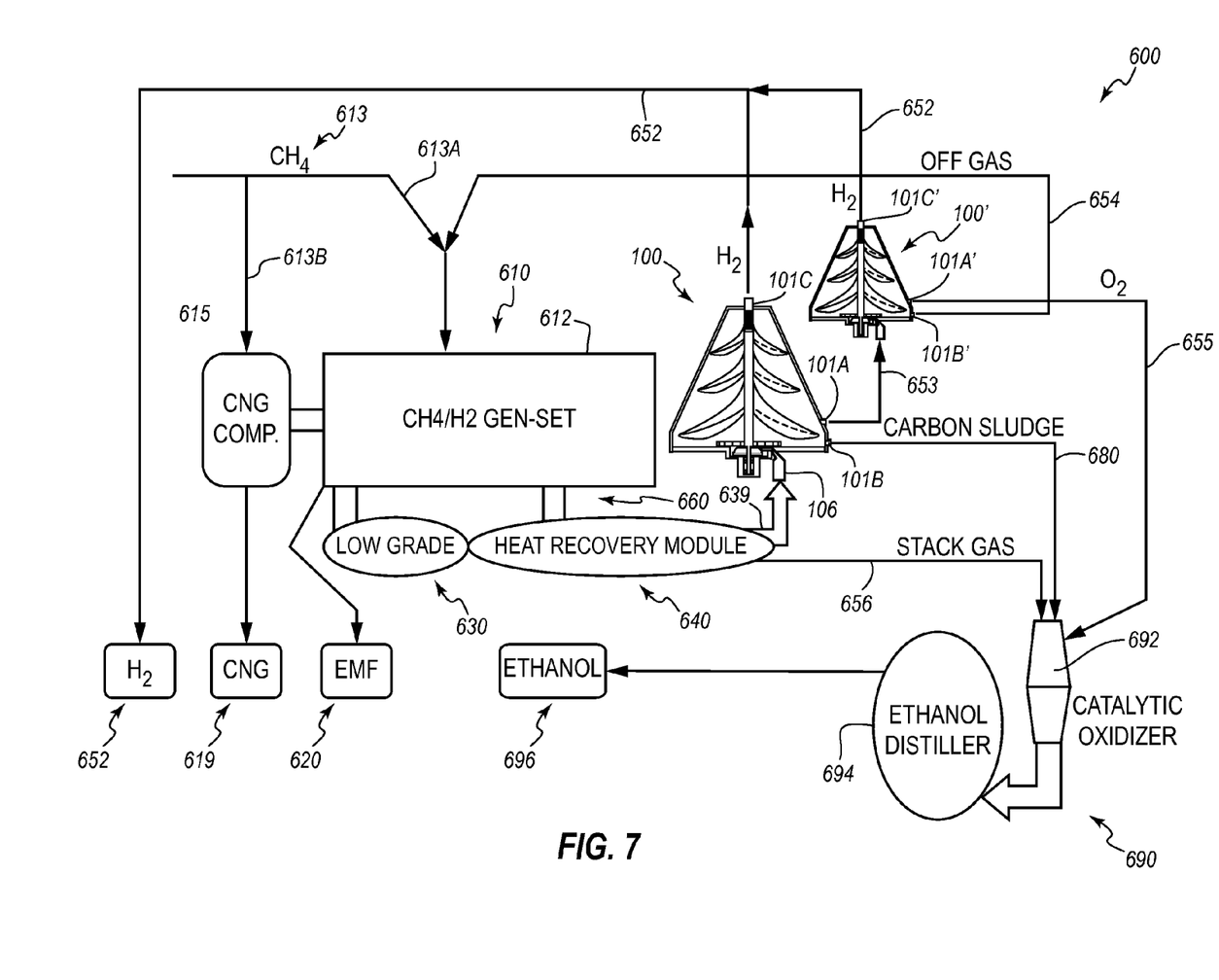
FIG. 7 is a schematic illustration of an embodiment of an energy recovery system in which one or more embodiments of separation units may be used.

A further example of an energy recovery system 600 in which one or more separation units 100 can be used is illustrated in FIG. 7. The energy recovery system 600 can resemble the energy recovery system 100 disclosed in application Ser. No. 12/947,040 in many respects, thus like features are identified with like reference numerals, except that the "1" hundreds numeral has been replaced with the numeral "6" (e.g., the feature identified by the reference numeral 600 in FIG. 7 represents a feature similar to the feature identified by the reference numeral 100 in FIG. 1 of application Ser. No. 12/947,040).

The energy recovery system 600, which also can be referred to as a power station or fuel station, can be highly efficient in the use and production of a variety of fuels. The energy recovery system 600 can include a base energy conversion system 110, which, in the illustrated embodiment, comprises an internal combustion engine 612. The internal combustion engine 612 can be configured to operate using one or more of natural gas, hydrogen, and/or other energetic gases. For example, the engine 612 can be supplied with natural gas 613 (which includes a high content of methane), as illustrated by the arrow pathway 613A. The engine 612 can convert the fuel into multiple forms of energy (e.g., heat, mechanical, electrical).

In the illustrated embodiment, the engine 612 is coupled with an operates a compressor 615, which can compress natural gas 613. Supply of natural gas 613 to the compressor 615 is shown by another arrow pathway 613B. Operation of the engine 612 thus can provide compressed natural gas, as shown at reference numeral 619. As shown at arrow 620, operation of the engine 612 can produce electricity, which can be used locally or delivered to a power grid. As further discussed below, operation of the engine 612 also can produce additional energy sources (or fuel), including purified hydrogen 652 and ethanol 696.

Operation of the engine 612 can produce waste heat, which can be recovered in a manner such as discussed in application Ser. No. 12/947,040 via a low-grade heat recovery and conveyance system 630, a heat recovery module 640, and a high-grade heat recovery and conveyance system 660. In the illustrated embodiment, exhaust from the engine 612 is conveyed through the high-grade heat recovery and conveyance system 660 where it thermally interacts with heated water vapor within the heat recovery module 640 and then is delivered as stack gas 656 to an ethanol module 690, which is discussed further below.

Steam is created in the low-grade heat recovery and conveyance system 630, is allowed to thermally interact with the exhaust of the engine 612 within the heat recovery module 640, and is delivered to the gasification unit 106 via the pathway 639. The output of the gasification unit 106 is delivered to the separation system 100 as working fluid, where separation of the constituent components takes place in any suitable manner discussed herein. Purified hydrogen 652 is removed from the separation system 100 via the evacuation port 101C and may be used a fuel. Carbon sludge 680 is removed from the separation system 100 via the evacuation port 101B and delivered to the ethanol module 690. Off gases 653 are removed from the separation system 100 via the evacuation port 101A and are delivered to a second separation system 100'. Additional hydrogen gas may be separated from the off gases 653 via the second separation system 100', and the additional purified hydrogen 652 can be removed from the second separation system 100' via an evacuation port 101C'.

The second separation system 100' may be configured to isolate oxygen gas in a substantially purified form. The purified oxygen 655 can be removed from the second separation system 100' via an evacuation port 101A', and it can be delivered to the ethanol module 690. Off gases 654 can be removed from the second separation system 100' via an evacuation port 101B' and delivered to the engine 612 as energetic fuel.

The ethanol module 690 can include any suitable ethanol production system and may employ any suitable method of ethanol production. For example, the ethanol module 690 may use any suitable feedstock (not shown) in the production of ethanol. In the illustrated embodiment, the ethanol production module 690 includes a catalytic oxidizer 692 and an ethanol distiller 694. The catalytic oxidizer 692 can receive the stack gas 656, the carbon sludge 653, and the purified oxygen 655 as inputs. Output from the catalytic oxidizer 692 can be delivered to the ethanol distiller 694, and the ethanol distiller 694 can provide an output of fuel-grade ethanol 696.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein. Recitation in the claims of the term "first" with respect to a feature or element does not necessarily imply the existence of a second or additional such feature or element. Moreover, recitation in the claims of the terms "first," "second," or the like is not limiting, such that third, fourth, fifth, etc. versions of any recited feature are possible where only "first" and "second" versions of that feature are specifically recited.

The invention claimed is:

1. A separation system comprising:
a separation chamber comprising a housing that defines one or more exit ports;
an impeller stack positioned within the housing, the impeller stack comprising a plurality of appendages that project laterally outwardly;
a diffusing impeller that is configured to rotate within the separation chamber, wherein the diffusing impeller defines one or more entrance ports into the separation chamber; and
a gasification unit that is configured to break down a hydrocarbon feedstock into its constituent components, wherein the gasification unit is configured to provide a working fluid to the separation chamber,
wherein, when a working fluid is received within the separation chamber and the impeller stack rotates, a plurality of independent forces generated by the separation system are brought to bear upon the constituent components of the working fluid so as to separate the constituent components from each other such that separated components can be removed via one or more of the exit ports of the housing, and wherein an exit port of the separation chamber is positioned so as to permit primarily hydrogen to be removed from the housing therethrough.

2. The separation system of claim 1, wherein the separation chamber is configured to be pressurized during operation of the system.

3. The separation system of claim 1, further comprising a charge source coupled with one or more of the housing and the impeller stack so as to create an electric field between the housing and the impeller stack.

4. The separation system of claim 1, wherein the housing defines a substantially frustoconical shape.

5. The separation system of claim 1, further comprising an additional exit port through which oxygen can be withdrawn from the separation chamber, wherein the additional exit port is at a lower longitudinal position than is the exit port through which hydrogen may be removed from the separation chamber.

6. The separation system of claim 1, wherein working fluid is delivered from the gasification unit to the diffusing impeller.

7. The separation system of claim 1, wherein the diffusing impeller is coupled with the impeller stack so as to rotate in unison therewith.

8. The separation system of claim 1, wherein hydrogen is removed from the separation chamber in a substantially pure form.

9. The separation system of claim 1, further comprising a control system that is configured to monitor conditions within the separation chamber and alter operational parameters in response thereto.

10. The separation system of claim 1, wherein the impeller stack comprises a shaft that defines one or more openings through which hydrogen can be removed from the separation chamber.

11. The separation system of claim 10, wherein the shaft extends through the exit port through which hydrogen can be removed from the separation chamber.

12. The separation system of claim 1, wherein the appendages of the impeller stack are charged so as to establish a desired polarity, and wherein each portion of each appendage that is charged is at the same polarity as the charged portions of the remaining appendages.

13. The separation system of claim 1, wherein the plurality of independent forces generated by the separation system comprise one or more of centrifugal force, magnetic force, and electrical force.

14. The separation system of claim 13, wherein gravitational forces are also brought to bear upon the constituent components of the working fluid so as to separate the constituent components from each other.

15. The separation system of claim 1, wherein the impeller stack is configured to provide a magnetic field.

16. The separation system of claim 15, wherein one or more of the appendages of the impeller stack are charged such that movement of the appendages gives rise to a magnetic field.

17. The separation system of claim 15, wherein the impeller stack comprises one or more permanent magnets such that rotation of the impeller stack gives rise to a rotational magnetic flux for polarized separation of the constituent components.

18. A separation system comprising:
a separation chamber comprising a housing that defines one or more exit ports, wherein at least a portion of the housing is charged at a first polarity;
an impeller stack positioned within the housing, the impeller stack comprising a plurality of charged appendages that project laterally outwardly, wherein each portion of each charged appendage is at a second polarity that is opposite of the first polarity, the impeller stack further comprising a shaft that defines an opening; and
a gasification unit that is configured to break down a hydrocarbon feedstock into its constituent components, wherein the gasification unit is configured to provide a working fluid to the separation chamber,
wherein, when a working fluid is received within the separation chamber and the impeller stack rotates, a plurality of independent forces operate on the constituent components of the working fluid to separate the constituent components from each other such that separated components can be removed via one or more of the exit ports of the housing, and wherein each of the opening of the shaft and an exit port of the separation chamber are positioned so as to permit primarily hydrogen to be removed from the housing therethrough.

19. The separation system of claim 18, wherein the housing is positively charged and the appendages are negatively charged.

20. The separation system of claim 18, wherein the separation chamber is configured to be pressurized during operation of the system.

21. The separation system of claim 18, further comprising a charge source coupled with one or more of the housing and the impeller stack.

22. A separation system comprising:
a separation chamber comprising a housing that defines one or more exit ports;
an impeller stack positioned within the housing, the impeller stack including a plurality of appendages that project laterally outwardly; and
a gasification unit that is configured to break down a hydrocarbon feedstock into its constituent components, wherein the gasification unit is configured to provide a working fluid to the separation chamber,
wherein, when a working fluid is received within the separation chamber and the impeller stack rotates, a plurality of independent forces generated by the separation system are brought to bear upon the constituent components of the working fluid so as to separate the constituent components from each other such that separated components can be removed via one or more of the exit ports of the housing, and wherein an exit port of the separation chamber is positioned so as to permit primarily hydrogen to be removed from the housing therethrough, and wherein the impeller stack comprises a shaft that defines one or more openings through which hydrogen can be removed from the separation chamber.

23. The separation system of claim 22, wherein the separation chamber is configured to be pressurized during operation of the system.

24. The separation system of claim 22, further comprising a charge source coupled with one or more of the housing and the impeller stack so as to create an electric field between the housing and the impeller stack.

25. The separation system of claim 22, wherein the housing defines a substantially frustoconical shape.

26. The separation system of claim 22, further comprising an additional exit port through which oxygen can be withdrawn from the separation chamber, wherein the additional exit port is at a lower longitudinal position than is the exit port through which hydrogen may be removed from the separation chamber.

27. The separation system of claim 22, further comprising a diffusing impeller that is configured to rotate within the separation chamber, wherein the diffusing impeller defines one or more entrance ports into the separation chamber, and wherein working fluid is delivered from the gasification unit to the diffusing impeller.

28. The separation system of claim 22, further comprising a diffusing impeller that is configured to rotate within the separation chamber, wherein the diffusing impeller defines one or more entrance ports into the separation chamber, and wherein the diffusing impeller is coupled with the impeller stack so as to rotate in unison therewith.

29. The separation system of claim 22, wherein hydrogen is removed from the separation chamber in a substantially pure form.

30. The separation system of claim 22, further comprising a control system that is configured to monitor conditions within the separation chamber and alter operational parameters in response thereto.

31. The separation system of claim 22, wherein the shaft extends through the exit port through which hydrogen can be removed from the separation chamber.

32. The separation system of claim 22, wherein the appendages of the impeller stack are charged so as to establish a desired polarity, and wherein each portion of each appendage that is charged is at the same polarity as the charged portions of the remaining appendages.

33. The separation system of claim 22, wherein the plurality of independent forces generated by the separation system comprise one or more of centrifugal force, magnetic force, and electrical force.

34. The separation system of claim 33, wherein gravitational forces are also brought to bear upon the constituent components of the working fluid so as to separate the constituent components from each other.

35. The separation system of claim 22, wherein the impeller stack is configured to provide a magnetic field.

36. The separation system of claim 35, wherein one or more of the appendages of the impeller stack are charged such that movement of the appendages gives rise to a magnetic field.

37. The separation system of claim 35, wherein the impeller stack comprises one or more permanent magnets such that rotation of the impeller stack gives rise to a rotational magnetic flux for polarized separation of the constituent components.

\* \* \* \* \*